(12) United States Patent
Koh

(10) Patent No.: US 11,218,764 B2
(45) Date of Patent: Jan. 4, 2022

(54) DISPLAY DEVICE, CONTROL METHOD THEREFOR, AND INFORMATION PROVIDING SYSTEM

(71) Applicant: SAMSUNG ELECTRONICS CO., LTD., Suwon-si (KR)

(72) Inventor: Kwang-hyun Koh, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 240 days.

(21) Appl. No.: 16/336,651

(22) PCT Filed: Sep. 29, 2017

(86) PCT No.: PCT/KR2017/010992
§ 371 (c)(1),
(2) Date: Mar. 26, 2019

(87) PCT Pub. No.: WO2018/066938
PCT Pub. Date: Apr. 12, 2018

(65) Prior Publication Data
US 2021/0092474 A1    Mar. 25, 2021

(30) Foreign Application Priority Data

Oct. 5, 2016 (KR) ........................ 10-2016-0128537

(51) Int. Cl.
*H04N 21/431* (2011.01)
*H04N 21/44* (2011.01)
*H04N 21/442* (2011.01)

(52) U.S. Cl.
CPC ... *H04N 21/4316* (2013.01); *H04N 21/44008* (2013.01); *H04N 21/44222* (2013.01)

(58) Field of Classification Search
CPC ......... H04N 21/4316; H04N 21/44222; H04N 21/44008; H04N 21/23418;
(Continued)

(56) References Cited

U.S. PATENT DOCUMENTS 10,142,679 B2 * 11/2018 Koh ................. G06K 9/00744
2002/0147984 A1 * 10/2002 Tomsen ............ H04N 21/8586
725/109

(Continued)

FOREIGN PATENT DOCUMENTS

EP      1 063 797       12/2000
JP      2012-159930      8/2012
(Continued)

OTHER PUBLICATIONS

International Search Report for PCT/KR2017/010992 with English translation, dated Jan. 18, 2018, 5 pages.

(Continued)

*Primary Examiner* — Farzana Hossain
(74) *Attorney, Agent, or Firm* — Nixon & Vanderhye, P.C.

(57) ABSTRACT

A display device is disclosed. The display device includes a display unit configured to display an image corresponding to contents; a processor configured to extract feature information from the contents; and a communicator configured to transmit, to an external server, the extracted feature information and search range information corresponding to the extracted feature information, and receive, from the external server, additional information corresponding to the feature information matching the extracted feature information in a search field corresponding to the search range information among a plurality of search fields, wherein the processor is further configured to control the display unit to display the received additional information.

15 Claims, 14 Drawing Sheets

(58) Field of Classification Search
CPC ......... H04N 21/4532; H04N 21/47217; H04N 21/4722; H04N 21/4828; H04N 21/6582; G06F 16/00; G06Q 30/02
See application file for complete search history.

(56) References Cited

U.S. PATENT DOCUMENTS

| | | |
|---|---|---|
| 2012/0197977 A1 | 8/2012 | Nagasaka et al. |
| 2012/0321125 A1 | 12/2012 | Choi et al. |
| 2013/0205318 A1 | 8/2013 | Sinha et al. |
| 2014/0082651 A1* | 3/2014 | Sharifi ............... H04N 21/4668 725/20 |
| 2015/0042882 A1* | 2/2015 | Park ................. H04N 21/44008 348/570 |
| 2015/0082330 A1* | 3/2015 | Yun ................. H04N 21/26603 725/14 |
| 2015/0100975 A1* | 4/2015 | Kim ................... H04N 21/4826 725/14 |
| 2016/0088365 A1 | 3/2016 | Yabu |
| 2016/0127759 A1* | 5/2016 | Jung ................... H04N 21/233 725/19 |

FOREIGN PATENT DOCUMENTS

| | | |
|---|---|---|
| JP | 5703321 | 4/2015 |
| JP | 2015-228162 | 12/2015 |
| KR | 10-2004-0041127 | 5/2004 |
| KR | 10-2012-0138282 | 12/2012 |
| KR | 10-2014-0074550 | 6/2014 |
| KR | 10-2015-0066657 | 6/2015 |
| KR | 10-2017-0069057 | 6/2017 |

OTHER PUBLICATIONS

Written Opinion of the ISA for PCT/KR2017/010992, with English translation, dated Jan. 18, 2018, 14 pages.

* cited by examiner

DISPLAY DEVICE, CONTROL METHOD THEREFOR, AND INFORMATION PROVIDING SYSTEM

CROSS-REFERENCE TO RELATED APPLICATION

This application is the U.S. national phase of International Application No. PCT/KR2017/010992 filed Sep. 29, 2017, which designated the U.S. and claims priority to Korean Patent Application No. 10-2016-0128537, filed on Oct. 5, 2016, in the Korean Intellectual Property Office, the entire contents of each of which are incorporated by reference.

BACKGROUND

1. Field

The disclosure relates to a display device, a control method therefor, and an information providing system, and more particularly, to a display device capable of improving contents recognition speed by using feature information extracted from contents and additional information, a control method therefor and an information providing system thereof.

2. Description of Related Art

As user's needs are gradually diversified, a source of broadcasting contents or multimedia contents have been changed from a single source centering on public TV network to various sources such as a cable, an internet protocol TV (IPTV), a video on demand (VoD), and the like. Also, sources providing information such as a customized advertisement or a program recommendation are generated.

The information on the customized advertisement or program recommendation needs to be properly provided to a scene which is currently output. For example, an advertisement message for a specific product is most effective when the advertisement message is displayed along with a scene in which the corresponding product is exposed. Therefore, a technology for recognizing what is currently displayed on a display device is needed.

To this end, a technology for recognizing contents by extracting feature data from the contents being output, matching the extracted feature data and the previously stored feature data appears. The automatic contents recognition (ACR) technology using fingerprints is the representative technology.

However, as the kinds of contents become diverse, the amount of feature data to be compared with the feature data extracted from the content being outputs is also very large, and thus, there is a drawback of requiring a lot of computation for matching operations. In addition, the speed of the matching operation is slowed accordingly, and therefore, there is a problem that the advertisement message and the like is not provided at the proper timing in the display device.

SUMMARY

Example embodiments may address the above disadvantages and other disadvantages not described above.

The disclosure addresses the above-mentioned need, and an example aspect of the disclosure is to provide a display device capable of improving contents recognition speed using feature information extracted from contents and additional information, a control method therefor, and an information providing system.

According to an embodiment of the disclosure, a display device is provided. The display device includes a display unit configured to display an image corresponding to contents; a processor configured to extract feature information from the contents; and a communicator to transmit, to an external server, the extracted feature information and search range information corresponding to the extracted feature information, and receive, from the external server, additional information corresponding to the feature information matching the extracted feature information in a search field corresponding to the search range information among a plurality of search fields.

The processor may control the display unit to display the received additional information.

The search range information may be main viewing channel information in the display device to be used for the external server to determine database from which feature information matching the extracted feature information is searched from among a plurality of databases by broadcasting channels, or to determine a search condition to search for feature information matching the extracted feature information.

The search range information may include at least one of viewing history information and source selection history information.

The search range information may further include information on a source providing the contents.

The processor may extract feature information from the contents at an extraction cycle corresponding to information of the source providing the contents.

The additional information may include at least one of identification information of the contents, advertisement information related to the contents, contents recommendation information related to the contents, and Internet address information related to the contents.

The processor may extract channel information from the contents and on a basis of the extracted channel information, determine whether to transmit the extracted feature information and search range information corresponding to the extracted feature information.

The extracted feature information may represent at least one of a text, a logo, a video fingerprint extracted from the image and an audio fingerprint extracted from audio of the contents.

According to an embodiment of the disclosure, an information providing system includes a display device configured to display a image corresponding to contents and extract feature information corresponding to the contents, and a server configured to receive, from the display device, the extracted feature information and search range information corresponding to the extracted feature information, search for feature information matching the extracted feature information in a search field corresponding to the search range information from among a plurality of search fields, and provide additional information corresponding to the searched feature information to the display device, and the display device displays the received additional information.

The search range information may represent main viewing channel information in the display device, and the server may search for feature information matching the extracted feature information from database which is determined based on the main viewing channel information from among a plurality of database by broadcasting channels.

The server may sequentially search from a search field corresponding to the search range information from among the plurality of search fields until feature information matching the extracted feature information is searched.

The search range information may include history information generated in response to use of the display device and information of the source providing the contents, and the server may search for feature information matching the extracted feature information within a search field corresponding to the history information and information of a source providing the contents from among the plurality of search fields.

The additional information may include at least one of identification information of the contents, advertisement information related to the contents, contents recommendation information related to the contents, and Internet address information related to the contents.

The extracted feature information may represent at least one of a text, a logo, a video fingerprint extracted from the image and an audio fingerprint extracted from audio of the contents.

A control method of a display device according to an embodiment of the disclosure includes displaying an image corresponding to contents; extracting feature information from the contents; transmitting, to an external server, the extracted feature information and search range information corresponding to the extracted feature information; and receiving, from the external server, additional information corresponding to the feature information matching the extracted feature information in a search field corresponding to the search range information among a plurality of search fields; and displaying the received additional information.

The search range information may be main viewing channel information in the display device to be used for the external server to determine database from which feature information matching the extracted feature information is searched from among a plurality of databases by broadcasting channels, or to determine a search condition to search for feature information matching the extracted feature information.

The search range information may include at least one of viewing history information and source selection history information.

The search range information may further include information on a source providing the contents.

The extracting may include extracting feature information from the contents with an extraction cycle corresponding to the information on the source providing the contents.

The additional information may include at least one of identification information of the contents, advertisement information related to the contents, contents recommendation information related to the contents, and Internet address information related to the contents.

The extracted feature information may represent at least one of a text, a logo, a video fingerprint extracted from the image and an audio fingerprint extracted from audio of the contents.

BRIEF DESCRIPTION OF THE DRAWINGS

The above and/or other aspects, features and advantages of certain embodiments of the disclosure will be more apparent from the following description, taken in conjunction with the accompanying drawings, in which.

DETAILED DESCRIPTION

In the following description of the disclosure, a detailed description of known functions and configurations incorporated herein will be omitted when it may make the subject matter of the disclosure rather unclear. The terms used below are defined in consideration of the functions of the disclosure, and this may vary depending on the intention of the user, the operator, or the like. Therefore, the definition should be based on the contents throughout this Specification.

The terms such as "first," "second," and so on may be used to describe a variety of elements, but the elements should not be limited by these terms. The terms are used only for the purpose of distinguishing one element from another.

A singular expression includes a plural expression, unless otherwise specified. It is to be understood that the terms such as "comprise" or "consist of" are used herein to designate a presence of characteristic, number, operation, element, component, or a combination thereof, and not to preclude a presence or a possibility of adding one or more of other characteristics, numbers, operations, elements, components or a combination thereof.

In the example embodiments of the disclosure, a "module" or a "unit" may perform at least one function or operation, and be implemented as hardware or software, or as a combination of hardware and software. Further, except for the "module" or the "unit" that has to be implemented as particular hardware, a plurality of "modules" or a plurality of "units" may be integrated into at least one module and implemented as at least one processor.

The disclosure will be described in greater detail below with reference to the accompanying drawings.

Figure 1:
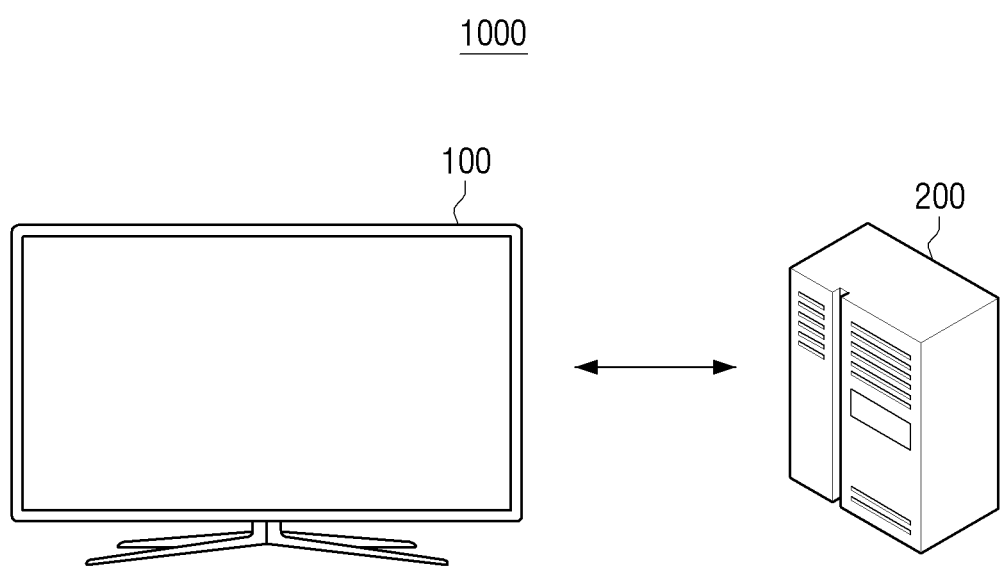
FIG. 1 is a view to describe an information providing system according to an embodiment of the disclosure.

FIG. 1 is a view to describe an information providing system according to an embodiment of the disclosure.

Referring to FIG. 1, an information providing system 1000 includes a display device 100 and a server 200.

The display device 100 is a device capable of displaying an image corresponding to contents. For example, the display device 100 may be an electronic device such as a TV, a PC, a mobile phone, a personal digital assistant (PDA), or the like.

Contents mean a media object that may be viewed from the display device 100. The contents may be divided into live broadcast contents, digital video recorder (DVR) contents, video on demand (VoD)/on the top (OTT) non-linear contents, user generated contents (UGC), or the like.

The display device 100 may extract feature information from the contents which are being output. The feature information may be, for example, a text, a logo, and a video fingerprint that are extracted from an image corresponding to the contents or an audio fingerprint extracted from audio of the contents.

Meanwhile, a fingerprint refers to data unique to an image or a sound of a section of contents. Specifically, the fingerprint is feature information extracted from a video signal or an audio signal, and reflects features inherent to the signal, unlike metadata based on texts. Therefore, fingerprint is also referred to as fingerprint data, DNA data, or gene data. For example, an audio fingerprint extracted from an audio signal is information indicating features such as frequency and amplitude of an audio signal, and a video fingerprint extracted from the video signal is information indicating features of a motion vector, color, and the like of the video signal. The fingerprint is used in Automatic Contents Recognition (ACR) technology.

The display device 100 may communicate with a server 200, transmit the feature information extracted from the contents to the server 200, and receive additional information corresponding to the feature information matching the extracted feature information, from among the feature information stored in the server 200.

In this case, the display device 100 may transmit, to the server 200, search range information indicating a search field having a high possibility that feature information matching the extracted feature information is present, from among a plurality of search fields in the server 200, along with the feature information.

Here, the search range information may include at least one of viewing history information, source selection history information, and information of a source providing contents.

The server 200 may search for feature information matching the feature information received from the display device 100. The server 200 may be referred to as a matching server. Specifically, the server 200 stores feature information received from the display device 100, a plurality of feature information to be compared with the received feature information, and additional information corresponding to the plurality of the feature information. The server 200 may search for the feature information matching the feature information received from the display device 100 among the plurality of feature information stored in the server 200 and transmit the additional information corresponding to the found feature information to the display device 100.

The additional information may include at least one of identification information of the contents, advertisement information related to the contents, contents recommendation information related to the contents, and Internet address information related to the contents. Here, the contents identification information may be electronic program guide (EPG) metadata for each channel when the contents is live broadcasting, and for contents such as VoD/OTT or custom contents such as an advertisement, the additional information may be information on pre-recorded contents.

The additional information may be stored in the server 200 or provided from an additional information providing server connected to the server 200.

In particular, the server 200, based on the search range information received along with the feature information from the display device 100, may perform search in a search field with a high possibility of having feature information that is the same or similar to the feature information received from the display 100, from among a plurality of search fields. Here, the search field may be also referred to as database.

Figure 2:
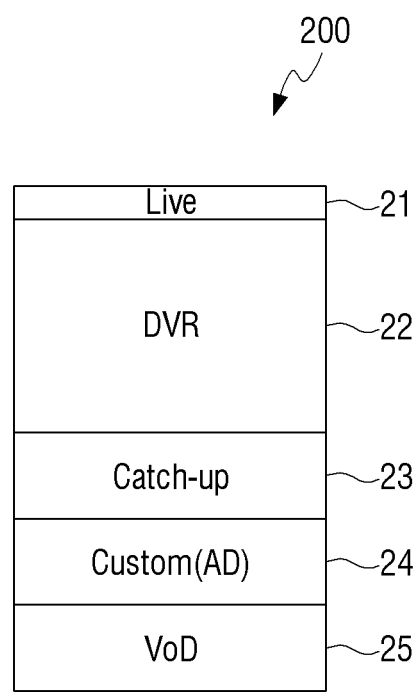
FIG. 2 is a view to describe a search field of a server according to an embodiment of the disclosure.

The plurality of search fields may be a search field classified by types of contents, a search field classified by the manufacturer of the contents, or a search field classified by the provider of the contents. As illustrated in FIG. 2, the server 200 may include a search field 21 including feature information on live broadcast contents, a search field 22 including feature information on the DVR contents, a search field 23 including feature information on catch-up contents, a search field 24 including feature information on a custom contents, and a search field 25 including feature information on VoD contents.

Based on the search range information received from the display device 100, if there is a high possibility that the feature information corresponding to the feature information received from the display device 100 is present in the search field 21 including the feature information on the live broadcast contents, the server 200 may perform search only in the search field 21 including the feature information of the live broadcast contents, instead of performing search in all the plurality of search fields.

Accordingly, since the search range may be reduced, the server cost may be reduced and the search time may be shortened. Therefore, the display device 100 may receive the additional information more quickly, and a user may receive information related to the currently displayed contents that are displayed in the display device 100 in real time at a more accurate timing.

In FIG. 1, it is illustrated that there is one server, but there may be a plurality of servers according to a function.

Among the various functions performed by the display device 100, some or all of the functions other than the video display function may be performed in the content providing device connected to the display device 100. For example, at least one of an operation of extracting feature information from contents by an electronic device such as a set-top box and a digital video recorder (DVR), which is connected to a display device and provides contents to the display device, an operation of transmitting the feature information and search range information to the server 200, and an operation of receiving the additional information from the server 200 may be performed.

In some cases, the display device 100 (or an electronic device such as a set-top box) and the server 200 may be implemented as one device.

Hereinbelow, the display device 100 and the server 200 will be described in a greater detail.

Figure 3:
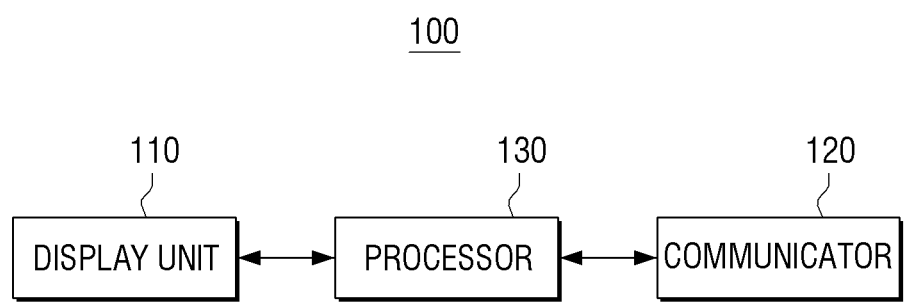
FIG. 3 is a block diagram to describe a configuration of a display device according to an embodiment of the disclosure.

FIG. 3 is a block diagram to describe a configuration of a display device 100 according to an embodiment of the disclosure.

Referring to FIG. 3, the display device 100 includes a display unit 110, a communicator 120, and a processor 130.

The display unit 110 is a configuration to display an image corresponding to the contents. The display unit 110 may be implemented as, for example, a liquid crystal display (LCD). In some cases, the display unit may be implemented as a cathode-ray tube (CRT), a plasma display panel (PDP), organic light emitting diodes (OLED), transparent OLED (TOLED), and the like. The display unit 110 may be implemented as a touch screen capable of sensing a touch manipulation of a user.

The communicator 120 is configured to perform communication with various external devices and may be connected to an external device through a wireless communication (for example, Z-wave, internet protocol version 4 (IPv4) over low-power wireless personal area networks (4LoWPAN), radio frequency identification (RFID), long-term evolution device to device (LTE D2D), Bluetooth low energy (BLE), general packet radio service (GPRS), Weightless, Edge Zigbee, ANT+, near field communication (NFC), infrared data association (IrDA), digital enhanced cordless telecommunications (DECT), wireless local area network (WLAN), Bluetooth, WiFi, Wi-Fi Direct, global system for mobile communications (GSM), universal mobile telecommunications system (UMTS), long-term evolution (LTE), wireless broadband (WiBRO)) as well as local area network (LAN) and an Internet network. The communicator 120 may include various communication chips such as a Wi-Fi chip, a Bluetooth chip, and a wireless communication chip.

The processor 130 is a configuration to control overall operations of the display device 100. The processor 130 may include a central processing unit (CPU), a random-access memory (RAM), read-only memory (ROM), and a system bus. Hereinabove, it has been described that the processor 130 includes only one CPU, but in implementation, there may be a plurality of CPUs (or digital signal processor (DSP), microprocessor unit (MPU), etc.). The processor 130 may be implemented as a micro-computer (MICOM), an application specific integrated circuit (ASIC), or the like.

The processor 130 may control the display unit 110 to display an image corresponding to the contents. The processor 130 may extract the feature information from the contents corresponding to an image displayed through the display unit 110.

The processor 130 may extract a text, a logo, or the like as the feature information from the displayed image. For extracting text, an optical character reader (OCR) may be used.

Figure 4:
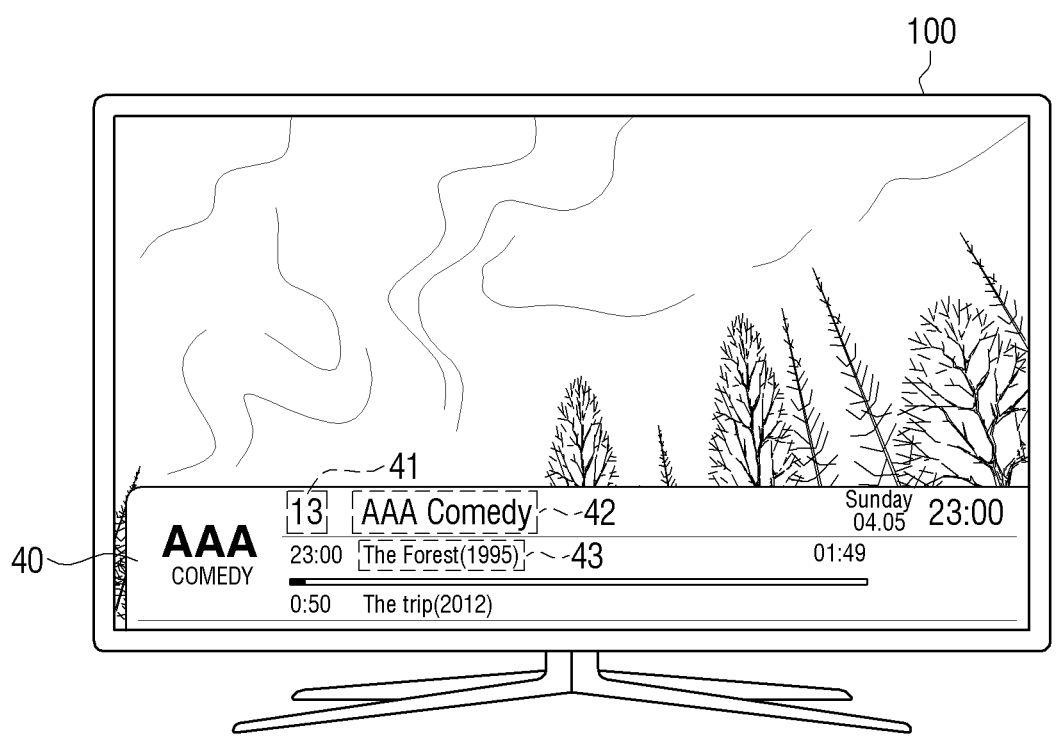
FIGS. 4 to 5 are views to describe an OCR recognition method of a display device according to various embodiments of the disclosure.
Figure 5:
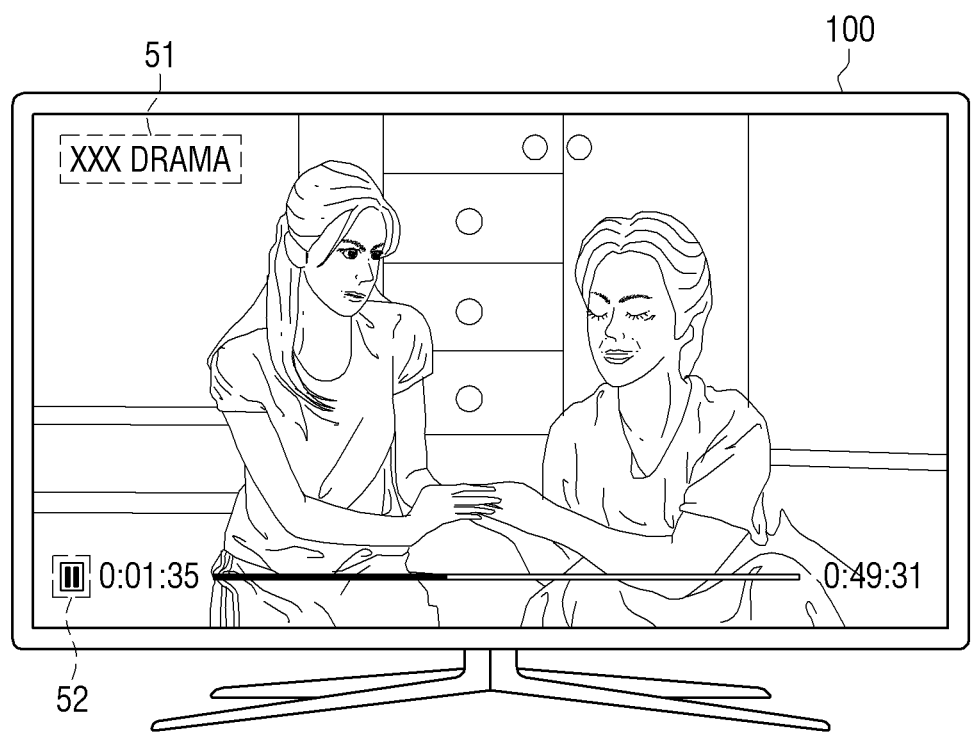

For example, as illustrated in FIG. 4, in a channel banner 40, texts such as a channel number 41, a channel name 42, a program name 43, and a channel call sign may be extracted as the feature information. As illustrated in FIG. 5, texts such as a content title 51 may be extracted as the feature information. Here, the OCR may be used.

A predetermined image 52 such as a start/stop button may be extracted as the feature information. The predetermined image 52 such as the start/stop button may indicate that the current contents are VoD contents or the like, not a live broadcast.

Figure 6:
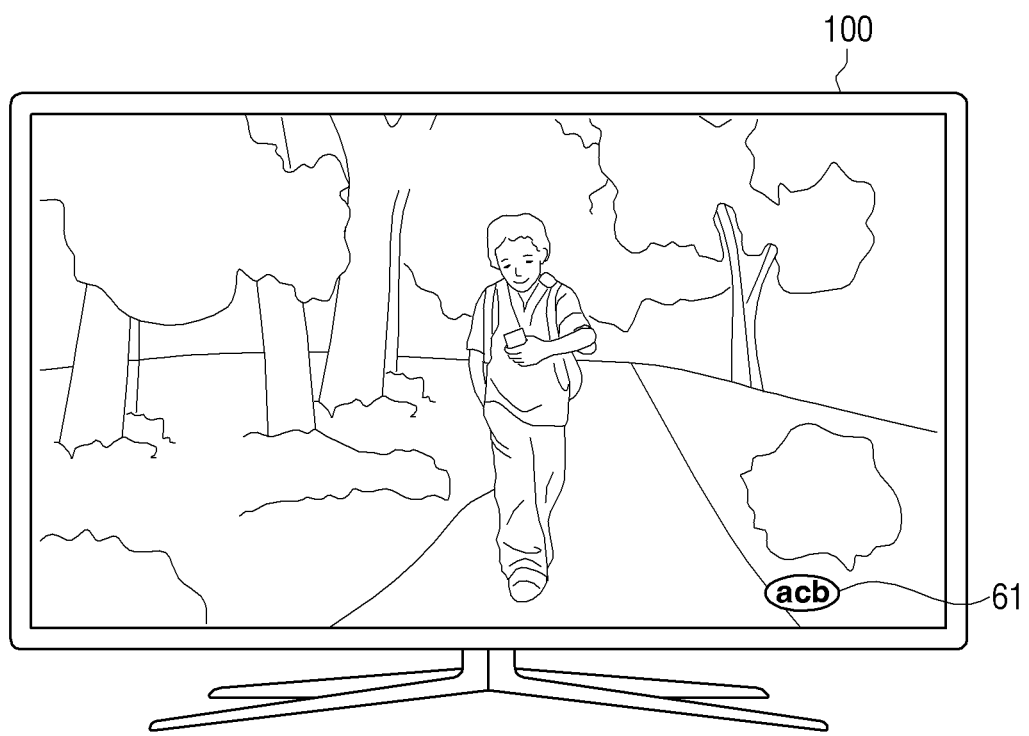
FIG. 6 is a view to describe logo recognition of a display device according to an embodiment of the disclosure.

As another example, a broadcasting company logo 61 may be extracted as the feature information as illustrated in FIG. 6.

The processor 130 may extract the video fingerprint from the displayed image. According to an example, the processor 130 may extract the video feature information for one image frame by extracting feature points including a specific coordinate within one image frame and sizes of a direction value of the coordinate according to a predetermined reference, selecting a few feature points in the order in which the direction value is large, and setting a predetermined relationship among the selected feature points.

The processor 130 may also extract the audio fingerprint from the audio of the contents corresponding to the displayed image. According to one example, the processor 130 may extract the audio fingerprint by dividing the audio signal at predetermined time intervals, calculating the sizes of the signals of the frequencies included in the respective time intervals, calculating the size difference between the signals of the adjacent frequency intervals to calculate the frequency slope, and quantizing the slop to one, if the slope is a positive number, and quantizing the slope to zero, if the slope is a negative number.

The processor 130 may control the communicator 120 to transmit the search range information to the server 200 along with the extracted feature information.

The search range information may be main viewing channel information in the display device 100 to be used for the server 200 in determining database for searching for the feature information matching the extracted feature information from among the plurality of database (or plurality of search fields) by broadcast channels or determining a search condition to search for the feature information matching the extracted feature information by the external server.

For example, when there is a history of viewing only 30 channels in the last month in the display device 100, the processor 130 may transmit information on the 30 channels to the server 200 as main viewing channel information. The server 200 may receive the main viewing channel information and the feature information and perform a search operation on the feature information only in the database corresponding to the 30 channels. In addition, the server 200 may generate a search formula based on the main viewing channel information as described above, and perform a search operation on the feature information based on the generated search formula.

According to another embodiment, the search range information may include at least one of the viewing history information and the source selection history information.

The viewing history information is, for example, information indicating a viewing history such as "live broadcast is not viewed through the display device 100" or "news is always viewed on Sunday evening at 8 o'clock through the display device 100". If the feature information is received from the display device 100 together with the viewing history information indicating that the "live broadcast is not viewed through the display device 100" to the server 200, this indicates that there is high possibility of displaying the non-linear contents such as VoD contents in the display device 100. Thus, the server 200 may perform the search operation except for the search field 21 including the feature information on the live broadcast contents as described with reference to FIG. 2. Alternatively, when the viewing history information indicating "news is always viewed at 8 o'clock on Sunday evening through the display device 100" is received from the display device 100 through the server 200 at 8 o'clock on Sunday evening along with the feature information, this means that there is a high probability that the user is viewing live broadcast news at 8:00 pm on Sunday. Thus, the server 200 may perform a search operation in the search field 21 including the feature information on the live broadcast contents described with reference to FIG. 2. Alternatively, when the viewing history information indicating that the program "American singer" is always viewed at 8:00 on Wednesday evening from the display device 100 is transmitted to the server 200, the server 200 may perform a search operation from the search field corresponding to the real-time broadcast contents of the broadcasting company of "American singer" at the corresponding time.

The source selection history information indicates history of selection of the source of the contents. The contents source includes various sources including the DVR, a set-top box, a tuner for receiving a broadcast signal, or the like. For example, when source selection history information includes information notifying that the DVR has not been used for recent 30 days as the contents source, if the source selection history information is transmitted to the server 200 from the display device 100 along with the feature information, the server 200 may perform a search operation except the search field 22 including the feature information regarding the DVR contents described through FIG. 2.

According to still another embodiment, the search range information may include not only information generated by the use of the display device 100 such as the viewing history information and the source selection history information but also information of a source providing the contents.

The information of the source providing the contents represents information on the source of the contents corresponding to the image currently displayed on the display unit 110. For example, if an image corresponding to the contents input through a high-definition multimedia interface (HDMI) source is displayed in the display unit 110, the processor 130 may obtain the information of the source providing the contents by checking the HDMI consumer electronics control (CEC) information. The CEC function is a function that enables devices connected by HDMI to control each other. If a device providing the contents is a device supporting the CEC function, the information of the provider of the device may be included in the HDMI CEC information.

As another example, the processor 130 may obtain information on a source providing the contents based on a remote control input for controlling the display device 100. If the channel up/down input is received from the remote controller, it may be known that the contents corresponding to the image currently displayed on the display unit 110 are live broadcast.

As another example, the processor 130 may obtain the information of the source providing the contents by checking the current input mode of the display device 100. For example, when the current input mode is the DVR input mode, it may be known that the contents corresponding to the image currently displayed on the display unit 110 are the DVR contents.

As another example, as described in FIGS. 4 to 6, it is possible to obtain information of a source that provides the contents by recognizing texts and images from the contents. Based on the information representing the contents source such as the channel number 41 and the channel name 42 of FIG. 4, the server 200 may perform search in the search field corresponding to channel 13 or "AAA COMEDY". The start/stop button 52 of FIG. 5 indicates that the current source of the contents is not a live broadcast and thus, the server 200 may perform the search except for the search field corresponding to the live broadcast contents. Since the broadcasting company logo 61 in FIG. 6 is also information indicating a contents source, the server 200 may specify the search field based thereon.

As described above, if not only the history information generated in response to the use of the display device 100, such as the viewing history information and the source selection history information, but also the information of the source providing the contents are transmitted to the server 200, the search range may be further narrowed. In other words, if various information is used in combination, the search speed in the server 200 may be further improved.

The information of the source providing the contents may be used not only for determining the range of the search field in the server 200 but also for determining the cycle for transmitting the feature information from the display device 100 to the server 200.

Specifically, the processor 130 may extract the feature information from the contents at an extraction cycle corresponding to the information of the source that provides the contents corresponding to the image displayed on the display unit 110, and control the communicator 120 to transmit the extracted feature information to the server 200. For example, when the contents source is a game machine and the server 200 has no additional information to be provided for the game image, the feature information does not need to be transmitted frequently to the server 200. In this case, the processor 130 may set the extraction cycle of the feature information to be longer than the general case while the contents source is the game machine.

The history of receiving additional information may be used to determine the feature information extraction cycle.

When the feature information extracted from the content provided by the specific contents source is transmitted to the server 200, the reception history information of the additional information may indicate whether the additional information has been received as a response from the server 200, that is, the matched feature information is searched. For example, the display device 100 includes inputs of a plurality of HDMI inputs, and from among them, if there is history of receiving a result that there is no matched feature information when the feature information extracted from the contents provided through the HDMI 3 is transmitted to the server 200, such information may be included in the history information of receiving the additional information. If the contents are provided again via the HDMI 3 again in the future, the processor 130, based on the history information of receiving the additional information, may determine that the feature information extracted from the contents via the HDMI 3 is not likely to match the feature information of the server 200, and set the feature information extraction cycle to be longer than a usual case.

Meanwhile, the processor 130 may extract channel information from the contents displayed on the display unit 110, and based on the extracted channel information, determine whether to transmit the feature information extracted from the contents and the search range information corresponding to the extracted feature information. For example, based on the channel information extracted from the contents, if it is estimated that the search result is not to be provided even if the feature information is transmitted to the server 200, transmitting the feature information may result in unnecessary increase of data transmission amount. Thus, according to the embodiment of the disclosure, such a case may be prevented from occurring.

In this case, the channel information may include any one of a broadcasting company name, a logo, a channel number, and a content name extracted by optical character reader (OCR) recognition or logo recognition. As a specific example, based on the broadcasting company name, logo, and the like extracted from the contents, when the broadcasting company that provides the contents is a broadcasting company that does not provide the database which will be a basis for search of the feature information to the server 200, the processor 130 will not transmit the feature information and the search range information extracted from the contents to the server 200. As another example, if the channel number extracted from the contents is a channel number introducing the VOD contents, the processor 130 will not transmit the feature information and the search range information extracted from the contents to the server 200.

According to still another embodiment, if the processor 130 determines that transmitting the feature information is not necessary based on the channel information, the operation to extract the feature information from the contents may be omitted.

Although not illustrated in FIG. 3, the display device 100 may include at least one of a tuner and an inputter/outputter. The tuner tunes and selects only a frequency of a channel desired to be received by the display device 100 among a lot of radio wave components through amplification, mixing, resonance, and the like of a broadcast signal received by wire or wireless. The broadcast signal includes video, audio, and additional data (for example, electronic program guide (EPG)).

The tuner may receive video, audio, and data from the frequency band corresponding to the channel number in response to the user input.

The tuner may receive broadcasting signals from various sources such as terrestrial broadcasting, cable broadcasting, or satellite broadcasting. The tuner may receive broadcast signals from sources such as analog broadcasts or digital broadcasts from various sources.

The tuner may be implemented as an all-in-one device with the display device 100 or a separate device (for example, a set-top box, now shown) having a tuner unit electrically connected to the display device 100, and a tuner (not shown) connected to the inputter/outputter.

The inputter/outputter may include at least one of the HDMI port corresponding to receiving of the contents, a component input jack, a PC input port, and a USB input jack. The inputter/outputter may be added, deleted and/or changed depending on the performance and structure of the display device 100.

Figure 7:
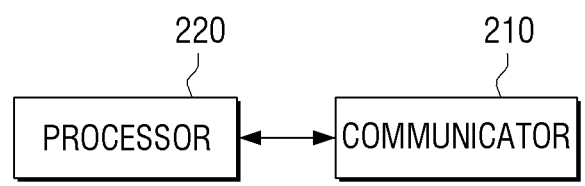
FIG. 7 is a block diagram to describe a configuration of a server according to an embodiment of the disclosure.

FIG. 7 is a block diagram to describe a configuration of a server 200 according to an embodiment of the disclosure.

The server 200 includes a communicator 210 and a processor 220.

The communicator 210 is configured to perform communication with various external devices and may be connected to an external device through a wireless communication (for example, Z-wave, internet protocol version 4 (IPv4) over low-power wireless personal area networks (4LoWPAN), radio frequency identification (RFID), long-term evolution device to device (LTE D2D), Bluetooth low energy (BLE), general packet radio service (GPRS), Weightless, Edge Zigbee, ANT+, near field communication (NFC), infrared data association (IrDA), digital enhanced cordless telecommunications (DECT), wireless local area network (WLAN), Bluetooth, WiFi, Wi-Fi Direct, global system for mobile communications (GSM), universal mobile telecommunications system (UMTS), long-term evolution (LTE), wireless broadband (WiBRO)) as well as local area network (LAN) and an Internet network. The communicator 210 may include various communication chips such as a Wi-Fi chip, a Bluetooth chip, and a wireless communication chip.

The processor 220 is a configuration to control overall operations of the server 200. The processor 220 may include the CPU, the RAM, the ROM, and a system bus. Hereinabove, it has been described that the processor 220 includes only one CPU, but in implementation, there may be a plurality of CPUs (or a digital signal processor (DSP) and a micro-processing unit (MPU)) in implementation. The processor 220 may be implemented as the microcomputer (MICOM), the application specific integrated circuit (ASIC), or the like.

In particular, the processor 220 may receive the feature information and the search range information corresponding to the feature information from the display device 110, search the feature information matched with the extracted feature information in a search field corresponding to the search range information from among a plurality of search fields, and control the communicator 210 to transmit the additional information corresponding to the searched feature information to the display device 100.

According to one embodiment, the search range information received from the display device 100 is the main viewing channel information in the display device 100, and the processor 220 may search for the feature information matching the feature information received from the display device 100 in the database which is determined based on the main viewing channel information from among a plurality of database by broadcasting channels.

Meanwhile, the processor 220 may perform a search only in the search field corresponding to the search range information, and then provide the search result to the display device 100. Accordingly, if the feature information matching the feature information received in the display device 100 is not searched, the processor 220 may transmit information indicating that the feature information has not been searched to the display device 100.

Alternatively, the processor 220 may sequentially search for a plurality of search fields until the feature information matching the feature information received from the display device 100 is searched. In this case, the search may be performed from the search field corresponding to the search range information received from the display device 100, from among a plurality of search fields. That is, the processor 220 may perform the search in the remaining search fields even if matching feature information is not detected in the search field corresponding to the search range information.

In some cases, the processor 220 may perform search using only the feature information received from the display device 100, even without the search range information.

The search range information received from the display device 100 may include history information generated in response to use of the display device 100 and information of a source providing the current contents in the display device 100. Here, the history information generated in response to the use of the display device 100 may include at least one of viewing history information and source selection history information.

In this case, the processor 220 may search for the feature information matching the feature information received from the display device 100 in the search field corresponding to the history information and the source information providing the contents among the plurality of search fields. As such, if various information in combination is used, the search range may be further narrowed.

It has been described that the display device 100 provides the search range information to the server 200, but it is also possible for another electronic device to provide the search range information to the server 200.

Figure 8:
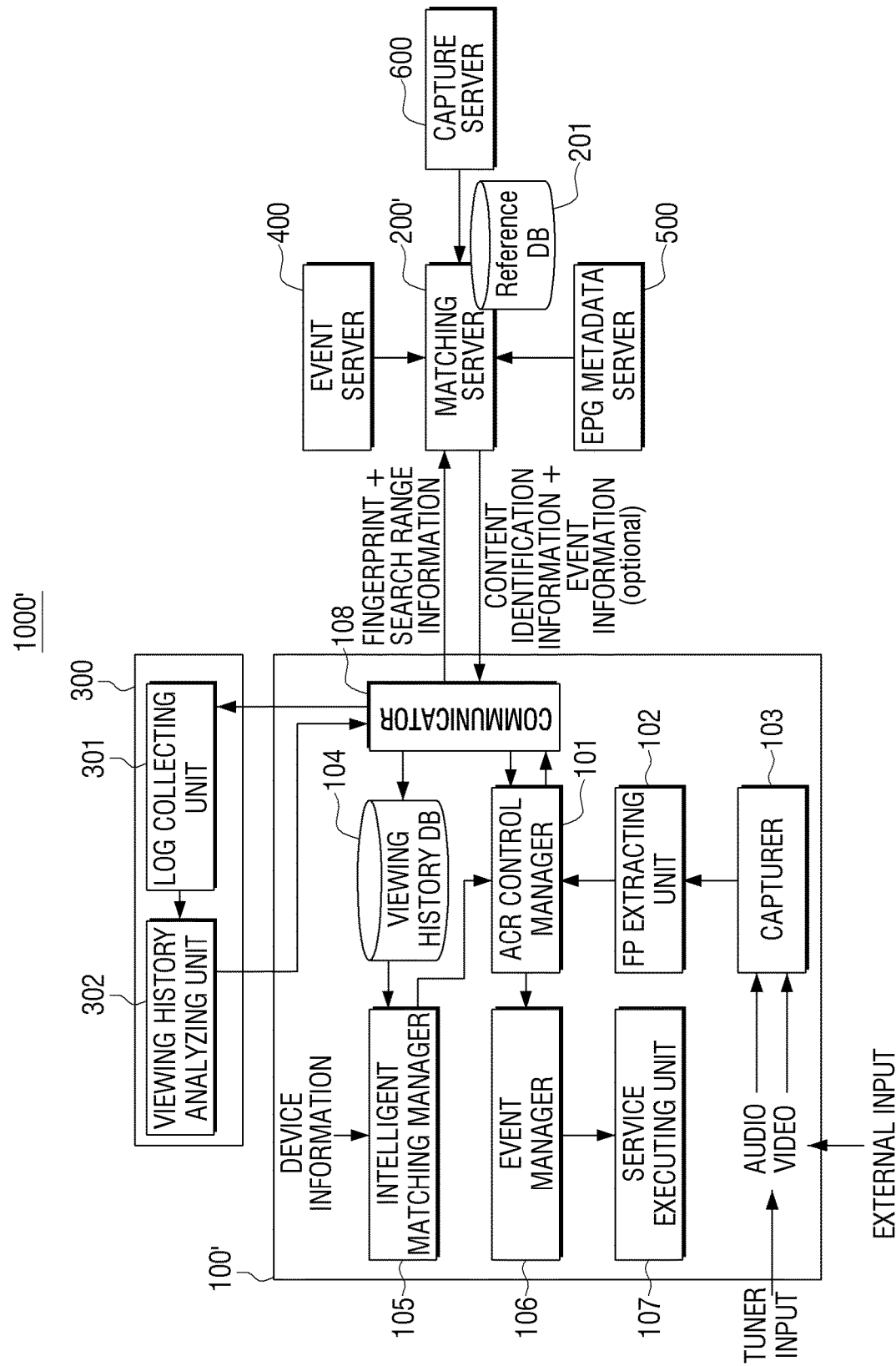
FIGS. 8, 12, and 13 are views to describe an information providing system according to still another embodiments of the disclosure.

FIG. 8 is a view for describing information providing system 1000' according to still another embodiment of the disclosure. In particular, the information providing system 1000' described in FIG. 8 is related to the case where audio and/or video fingerprints are used as the feature information.

Referring to FIG. 8, the information providing system 1000' includes a display device 100', a matching server 200', an analytics server 300, an event server 400, an electronic program guides (EPG) metadata server 500, and a capture server 600.

The display 100' indicates a case in which the display above 100 is implemented as a TV.

An element of the display device 100' will be described. A capturer 103 is a configuration to capture audio or video from a multimedia contents signal received from a tuner input or an external input. The external input may be set-top box, HDMI dongle, or the like.

A fingerprint extracting unit 102 is a configuration to extract video and/or audio fingerprints. The communicator 108 performs communication with the matching server 200'. The ACR control manager 101 controls the entire ACR matching. The viewing history database 104 stores the viewing history of the display device 100'. The viewing history database 104 may store the viewing history as well as the analyzed viewing pattern. The viewing history database 104 may include a module for communicating with the analytics server 300 to receive and store the viewing history. An information usage determining unit 105 receives the viewing history information and the device information and determines whether to use the information for fingerprint matching. That is, the information usage determining unit determines whether to transmit the search range information including at least one of the viewing history information and the device information to the matching server 200. The device information is a source of the contents, that is, information of a device providing the contents. For example, when the contents are provided by the set-top box through the external input, the information of the manufacturer of the set-top box may be included, and if the contents are provided by the tuner input as a broadcasting signal, the information on the broadcasting company corresponding to the broadcasting signal may be included. In addition, the device information may be information of the display device 100' itself. Information on the display device 100' itself may include information on the location where the display device 100' is installed, manufacturer information, and the like.

The analytics server 300 is a server for collecting and analyzing viewing logs from the display device 100' and may include a log collecting unit 301 and a viewing history analyzing unit 302. The viewing logs collected from the display device 100' are refined and stored, and the analysis work is performed in various ways. The analytics server 300 is connected not only to the display device 100' but also to other devices, may collect viewing logs from various devices, and manage the viewing logs by devices. The analytics server 300 may perform a statistical analysis on the entire log and a personalization analysis for grasping the viewing pattern for each device. Through this, a viewing pattern (For example, viewing history information indicating that the program "talk show" is always viewed for the last four weeks on Wednesday evening at eight o'clock through the display device 100') that may reduce a search range in the ACR fingerprinting matching may be generated. The information thus generated may be stored in the viewing history database 104 through the communicator 108.

A capture server 600 is a server for extracting fingerprints from the contents. To be specific, the fingerprints may be extracted by capturing live broadcasting tuner bank or file/streaming contents.

An electronic program guides (EPG) metadata server 500 is a server providing EPG metadata information and may provide metadata information of non-linear contents such as video on demand (VoD)/over the top (OTT) and user-generated content (UGC) according to the contents as well as EPG metadata of live broadcast. The EPG metadata server 500 may be linked to the capture server 600 instead of the matching server 200'. The EPG metadata server 500 is a server that may provide contents identification information that may be included in the additional information described in the above embodiments.

An event server 400 is a server for providing an event related to an overlay or a contents linked service. The event server 400 is a server that may provide advertisement information related to contents, contents recommendation information related to contents, Internet address information related to contents, etc., which may be included in the additional information described in the above-described embodiments.

The matching server 200' may collect and store the information provided from the capture server 600, the EPG metadata server 500, the event server 400, and the like, and if the fingerprint is delivered from the display device 100', search for a matching fingerprint and provide the contents identification information corresponding to the searched fingerprint to the display device 100'. In some cases, event information such as advertisement information related to the contents, contents recommendation information related to the contents, Internet address information related to the contents, and the like may be provided to the display device 100' as the contents identification information. The transmission of event information is not mandatory but is selective.

Though not illustrated, a front-end server may be present between the matching server 200' and the display device 100'. The matching server 200' may be composed of one or a plurality of servers.

An event manager 106 may transmit information for executing an event to a service executing unit 107. To be specific, the event information received from the matching server 200' and information on the time at which the event information is to be output may be transmitted to the service executing unit 107. The service executing unit 107 may provide a service such as displaying event information together with the contents. In the meantime, when the display device 100' is a TV, the service may be executed in the TV, but may also be executed by another device connected to the display device 100' via network, for example, a mobile device such as a smart phone.

Though not illustrated in FIG. 8, the display device 100' includes the display unit 110 described through FIG. 3.

Figure 9:
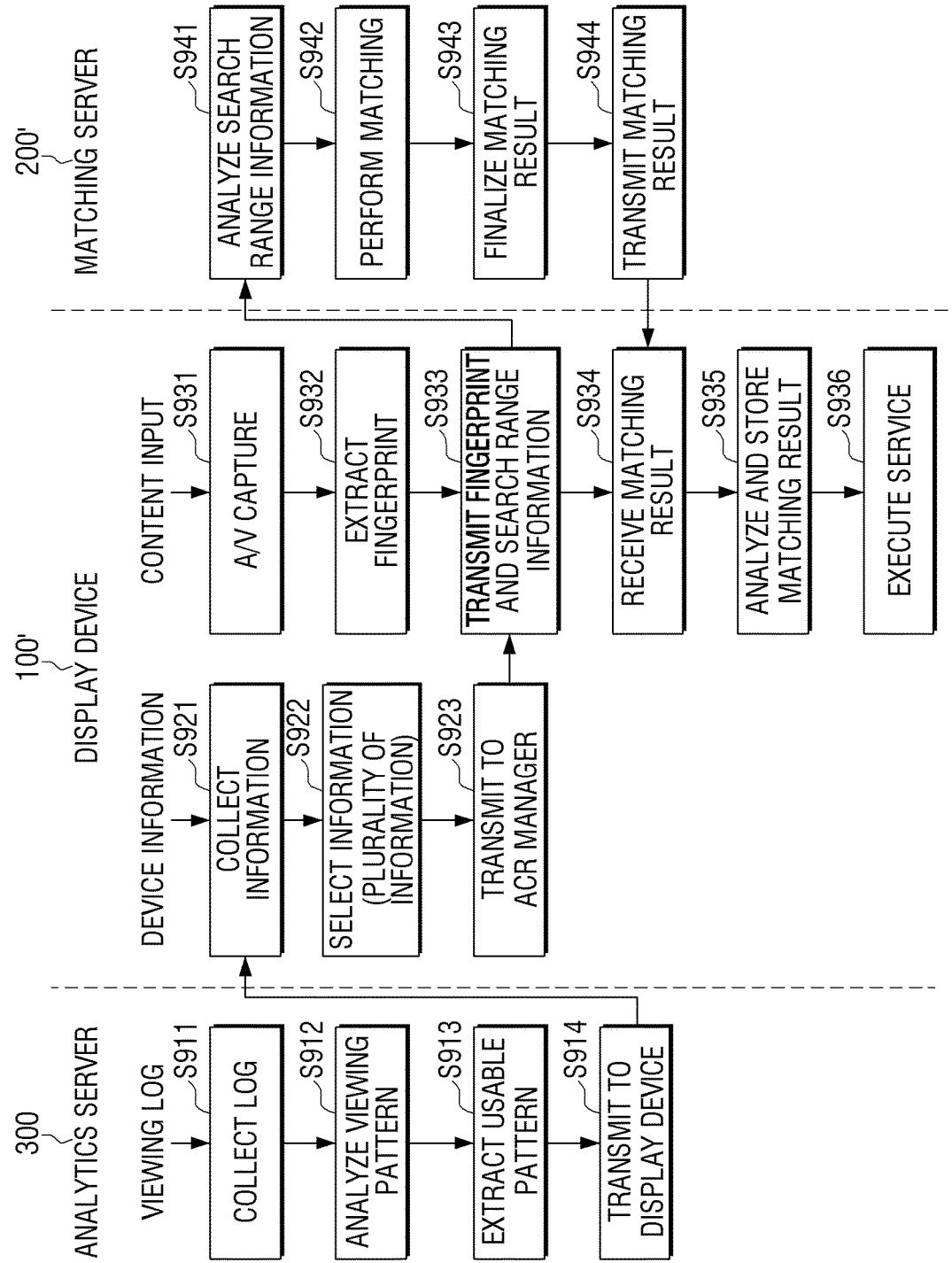
FIG. 9 is a flowchart to describe an operation of the information providing system according to an embodiment of the disclosure.

FIG. 9 is a flowchart to further describe an operation of the information providing system 1000' of FIG. 8.

Referring to FIGS. 8 and 9, the analytics server 300 collects the viewing log generated in the display device 100' in operation S911, and analyzes the viewing pattern of the display device 100' in operation S912. Then, among the various viewing patterns analyzed, a viewing pattern which may be used for fingerprint matching is extracted in operation S913. The extracted viewing pattern is transmitted to the viewing history database 104 of the display device 100' in operation S914.

The display device 100' uses device information such as information on a contents providing source or information on the display device 100' together with the information received from the analytics server 200. The information on the contents providing source may be generated corresponding to the button input on a remote controller for controlling the display device 100'. For example, if a channel up/down button is input from the remote controller, the display device 100' may recognize that the current contents source is live broadcast. Also, the display device 100' may determine whether the contents are being provided with the current tuner input, or the external input (e.g., set-top box, high-definition multimedia interface (HDMI) dongle, etc.), and may identify the contents source (e.g., HDMI CEC information). The display device 100' collects the information received from the analytics server 200 and the device information as described above in operation S921.

In addition to the above operation, the display device 100' captures by the capturer 103 the audio and/or video signals during the contents viewing in operation S931, and the fingerprint extracting unit 102 extracts audio and/or video fingerprints in operation S932. At this time, the information usage determining unit 105 selects the viewing history information or device information collected in the viewing history database 104 as information to be used for fingerprint matching in operation S922. For example, at least one of a main viewing channel list or an additional information reception history at the HDMI input, or a provider of the HDMI CEC, information of the display device 100', or DVR usage history may be selected. The information selected by information usage determining unit 105 is transmitted to the ACR control manager 101 as search range information in operation S923.

The ACR control manager 101 transmits the search range information together with the fingerprint to the matching server 200 according to a predetermined query cycle in operation S933. The query period may be determined by the device information.

The matching server 200 analyzes the received search range information in operation S941, determines a search field to search for the received fingerprint based on the search range information, and performs a matching operation in operation S942. For example, as a result of the search range information analysis, if there is no DVR use history in the display device 100', the matching server 200' performs fingerprint matching excluding the search field corresponding to the DVR contents. As another example, as a result of the search range information analysis, if only 30 channels have been viewed in the display device 100' in the last month, the matching server 200' performs fingerprint matching in the search field corresponding to the 30 channels. As still another example, when the information of the HDMI CEC included in the search range information indicates a game machine, the matching server 200' performs fingerprint matching excluding the search field corresponding to the live broadcast and the DVR contents.

According to the matching, the matching server 200' finalizes the matching result in operation S943. The matching result may include additional information such as the contents identification information and advertisement information associated with the contents, or the like. The matching server 200' transmits the result to the display device 100' in operation S944, and the display device 100' receives the matching result in operation S934, analyzes and stores the matching result in operation S935.

The display device 100' executes the service according to the matching result in operation S936. For example, it is possible to display advertisement information associated with contents, display opinion convergence information related to the contents, display a UI for Internet address connection associated with the contents, transmit content identification information to the analytics server 200, or the like.

Figure 10:
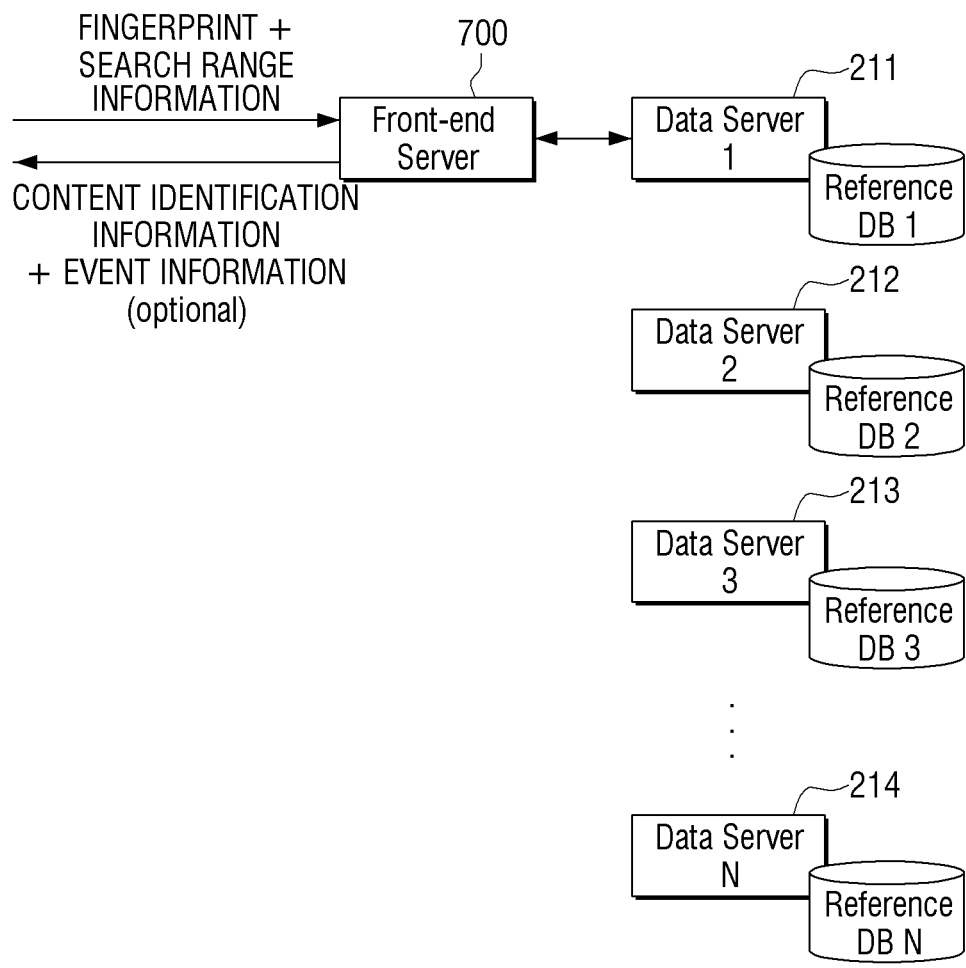
FIGS. 10 and 11 are views to describe a search database in the information providing system according to various embodiments of the disclosure.

FIG. 10 is a diagram for describing an example of searching in the matching server 200' in greater detail. According to one embodiment of the disclosure, as shown in FIG. 10, a front-end server 700 may exist between the display device 100' and the matching server 200'.

A plurality of data servers 211, 212, 213, and 214 exist in the matching server 200'. The front-end server 700 may determine the search field by analyzing the search range information received from the display device 100'. Therefore, instead of searching for all the search fields divided by the plurality of data servers 211, 212, 213, and 214, the matching server 200' may limit the search field to the first data server 211 based on the search range information received from the display device 100' and exclude the second data server to $n^{th}$ data server 212, 213, ..., 214. In this case, only the specific search field may be searched and the search result may be transmitted to the display device 100', or in the case where there is no matching result in the specific search field, the search may be performed for other searched search fields. In other words, if one data server fails in searching, the next data server may be used. In the meantime, search fields corresponding to various content types may exist in each data server.

Figure 11:
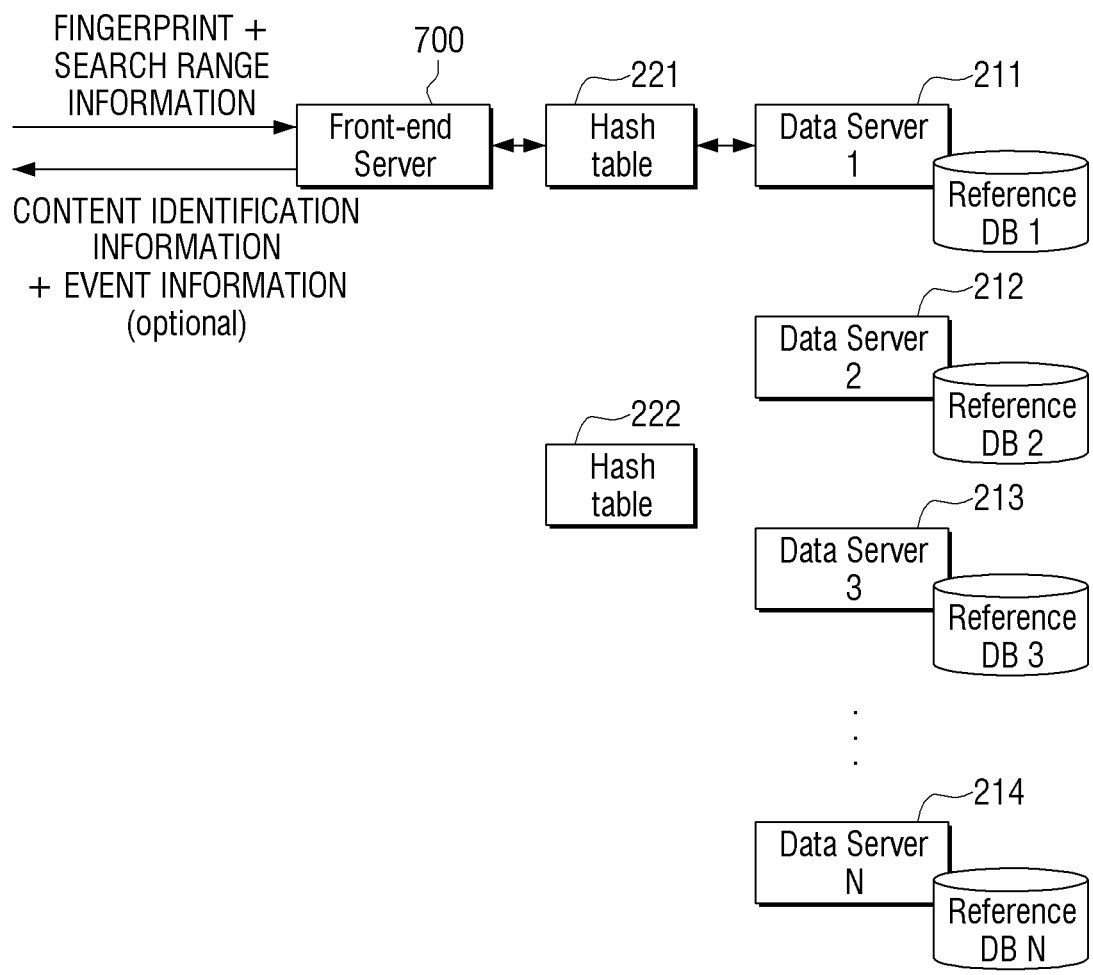

As shown in FIG. 11, a method of using hash tables 221 and 222 inside or outside the data server may also be used. In this case, the front-end server 700 may determine the search field using the hash tables 221 and 222 according to the result of analyzing the search range information received from the display device 100'.

Figure 12:
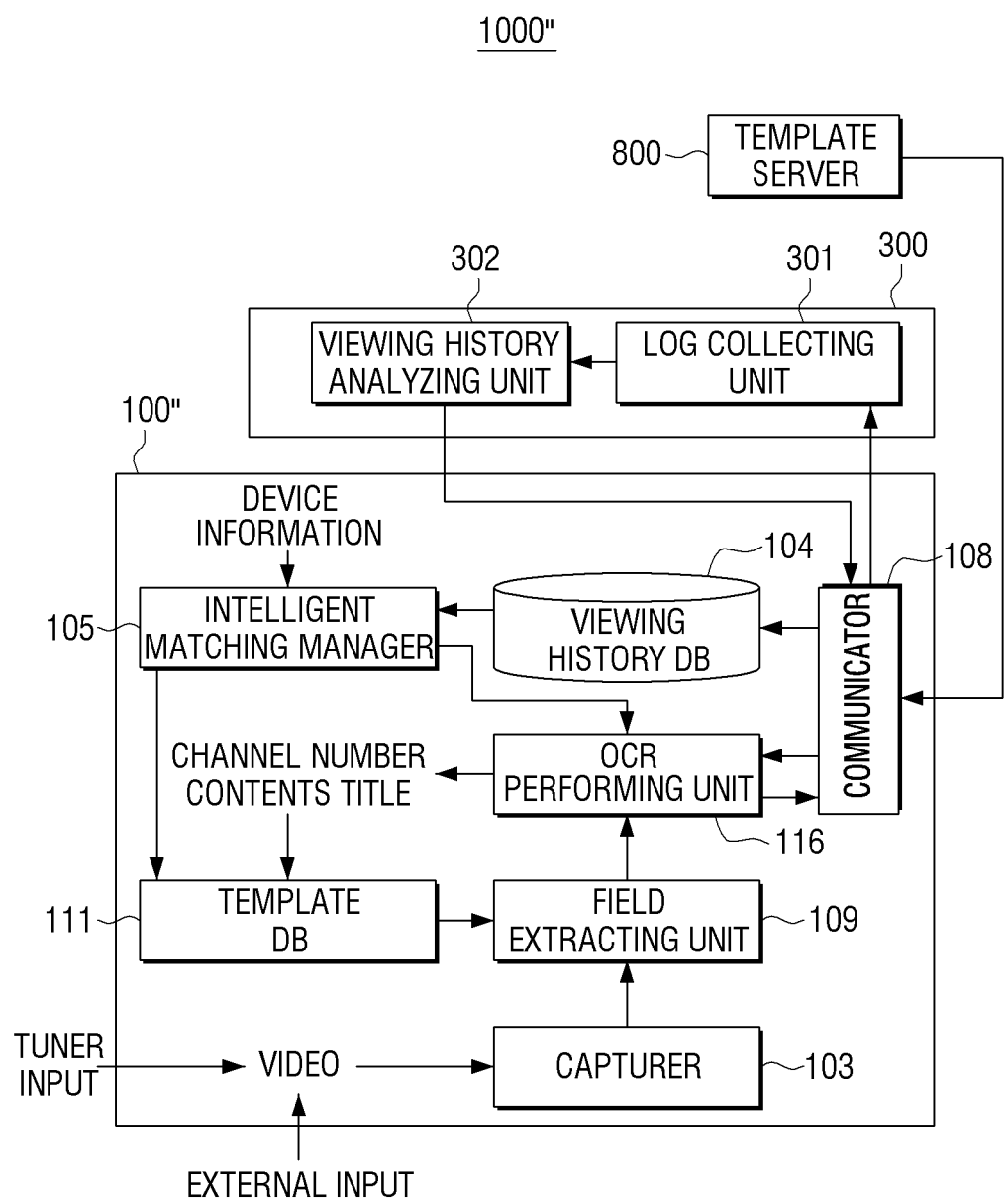

FIG. 12 is a view to describe an information providing system 1000" according to still another embodiment of the disclosure. In particular, the information providing system 1000" as described in FIG. 12 relates to the case where OCR is used for feature information extraction.

Referring to FIG. 12, the information providing system 1000" includes a display device 100", the analytics server 300, and a template server 800.

The display device 100" is another example of implementation of the above-described display device 100 as a TV. The description of the components already described in FIG. 8 among the components of the display device 100" will be omitted.

Referring to FIG. 12, the template which will be used for extracting a field when performing OCR may be embedded in the template database 111 in advance, or downloaded from the template server 800 periodically, non-periodically, in advance, or on a real-time basis.

The capturer 103 captures a video signal or an audio signal from a tuner input or a cable, satellite, IPTV set-top box, HDMI dongle, or streaming video (content transferred from Wi-Fi or a wireless network). A field extracting unit 109 searches for a field to perform OCR. Specifically, the field extracting unit 109 extracts a field from the template database 111 by obtaining information on a field for performing the OCR. An OCR performing unit 116 performs the OCR in the field determined by the field extracting unit 109.

The OCR performing unit 116 may extract various types of information. For example, in the case of viewing a live broadcast using a set-top box, information such as a channel number, a channel call sign, and a program name may be extracted. In the case of viewing non-linear contents such as VoD, a title of the contents may be extracted. The viewing history database 104 downloads and analyzes the viewing pattern analyzed by the analytics server 300 from the server, and the information usage determining unit 105 may determine whether to perform OCR using the viewing pattern.

The OCR performing unit 116 recognizes numbers and characters, and obtains information on channel numbers, channel names, and program names. This information is transmitted to the analytics server 300 and collected by a log collecting unit 301. The viewing history analyzing unit 302 generates viewing history information based on the collected information, the viewing history information may be transmitted to the display device 100''' via network and stored in the viewing history database 104. The viewing history may be obtained not only by the OCR analysis but also by fingerprint matching or logo recognition.

The information usage determining unit 105 may collect viewing history information, device information (for example, contents source information), and provide the information to the OCR performing unit 116 and the template database 111 so as to perform OCR, and the OCR performing unit 116 may perform OCR by selecting a field or information to perform OCR using the viewing history. For example, when it is determined based on the viewing history information that the VoD contents have been viewed most in the past one month, the field extracting unit 109 may receive, from the template database 111, a template corresponding to a filed corresponding to a top left portion (see FIG. 5) in which the title of the VoD contents is located, and when the template is transmitted to the OCR performing unit 116, the OCR performing unit 116 may perform the OCR from the top left portion of the image. Further, it is also possible to select a language to perform OCR based on the viewing history information and the device information. For example, the device information may include information on installation location of the display device 100'', and if the installation location is Korea, the language for performing OCR may be set to Korean. Through this, less OCR operations may be performed than performing OCR operations for all fields of an image or OCR operations in various languages, and accordingly, CPU usage may be reduced. Alternatively, when the source providing the contents currently being output is a game machine, based on information on the contents providing source, the OCR recognition may be controlled not to be performed.

In the meantime, the feature information such as the channel number and the contents title extracted by performing the OCR may be transmitted to the server 200, and the display device 100'' may receive corresponding additional information from the server 200.

Figure 13:
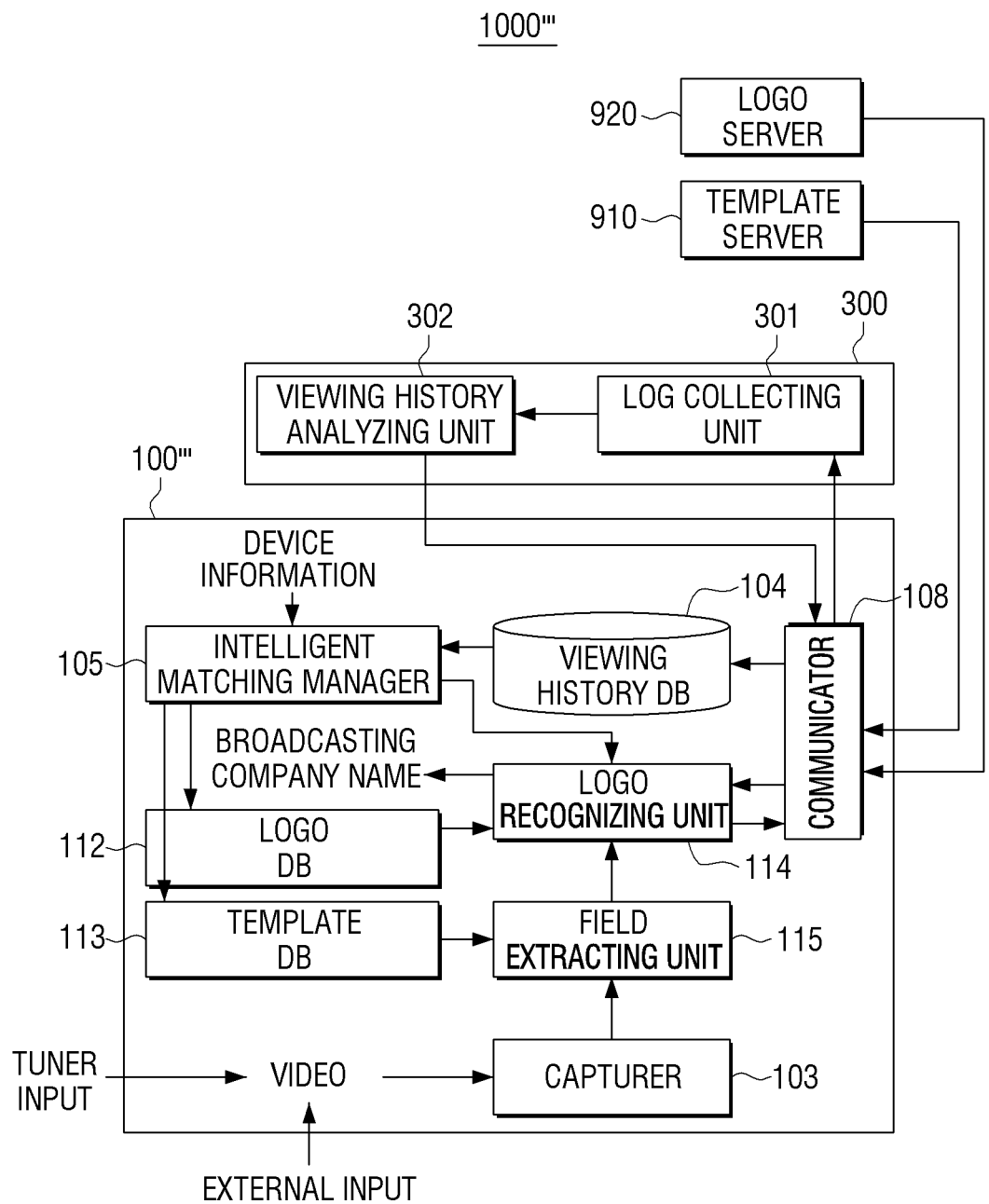

In particular, the information providing system 1000''' of FIG. 13 relates to the case in which the logo recognition is used for extracting the feature information.

Referring to FIG. 13, the information providing system 1000''' includes a display device''', the analytic server 300, the template server 910, and the logo server 920.

The display device 100''' is another example in which the above-described display device 100 is implemented as a TV. The description of the components already described in FIG. 8 among the components of the display device 100''' will be omitted.

Referring to FIG. 13, the capturer 103 captures a video signal or an audio signal from a tuner input, a cable, a satellite, an IPTV set-top box, an HDMI dongle, or a streaming video (content transferred from a Wi-Fi or a wireless network).

The field extracting unit 115 is a configuration for searching a field for performing logo recognition.

The position information of the logo is transferred from the template database 113 to the field extracting unit 115 and the logo image (or image feature) is transmitted from the logo database 112 to the logo recognizing unit 114, and logo recognition is performed in the logo recognizing unit 114.

Templates and logos may be pre-stored in the template database 113 and the logo database 112, respectively, or may be periodically/non-periodically, pre-loaded or real-time downloaded from the template server 910 or the logo server 920.

The result of the logo recognition is transmitted to the analytics server 300 through the network, and the viewing history information generated in the analytics server 300 may be transmitted to the viewing history database 104. The viewing history information may be generated through logo recognition or by information extracted through fingerprint matching or OCR. The information usage determining unit 105 may determine whether to use the viewing information or device information when recognizing the logo. For example, if there is a channel that is mainly viewed on a specific day of the week or at a specific time, the logo extracted from the video may be compared with the channel logo first, and the recognition time may be reduced. In the case where the device information is used, if the display device''' is installed in Korea, the logo recognizing unit 114 may limit the comparison object only with the logos of the Korean broadcasting companies. Alternatively, when the source providing the content currently being output is a game machine, based on information on the content providing source, logo recognition may be controlled not to be performed.

The recognized logo may be transmitted to the server 200 as the feature information, and the display device 100''' may receive the corresponding additional information from the server 200.

In FIGS. 8, 12, and 13, it has been described that the fingerprint analysis method, the OCR analysis method, and the logo analysis method are respectively performed in different devices, but it is also possible that at least two of the methods are performed in combination.

In the meantime, the feature information such as the channel number, the content title, and the recognized logo extracted by performing the OCR may be used to reduce the search range in the server when recognizing the content through the fingerprint. For example, when it is confirmed by the OCR what is a current channel, fingerprint matching may be performed only in the search field corresponding to the channel. Alternatively, if it is confirmed that the current contents are the contents of a specific broadcasting company by the logo recognition, fingerprint matching may be performed only in the search field corresponding to the broadcasting company.

As a still another example, channel information (for example, contents title, channel number, logo, broadcasting company name, etc.) extracted from contents by performing OCR or logo recognition may be used to reduce the amount of server queries for fingerprint matching. As a specific example, if the channel number extracted from the currently displayed contents is a number corresponding to the VOD introduction channel provided by the set-top box provider (generally, the VOD introduction channel is assigned to the channel number 0), it is not necessary to perform fingerprint matching. Accordingly, while the content is being displayed, the operation of extracting the fingerprint and/or the operation of transmitting the fingerprint to the matching server are not performed. As still another example, if the contents title currently being displayed corresponds to a news flash, it is generally likely that the news flash is contents broadcasted by a broadcasting company in a sudden manner, and it is highly likely that a fingerprint corresponding to the news flash is not provided in advance in the matching server. Therefore, the operation of extracting the finger print and/or transmitting the fingerprint to the matching server are not performed while the news flash is being is displayed. As another example, if a broadcasting company corresponding to the broadcasting company name extracted from the currently displayed contents is a broadcasting company that does not provide the contents to the matching server, the operation of extracting the fingerprint from the contents and/or transmitting the fingerprint to the matching server is performed.

In the above-described embodiments, only the matching, OCR, and logo recognition using the fingerprint have been described. However, in similar technologies, the viewing history information and the device information may be used for efficient recognition.

Figure 14:
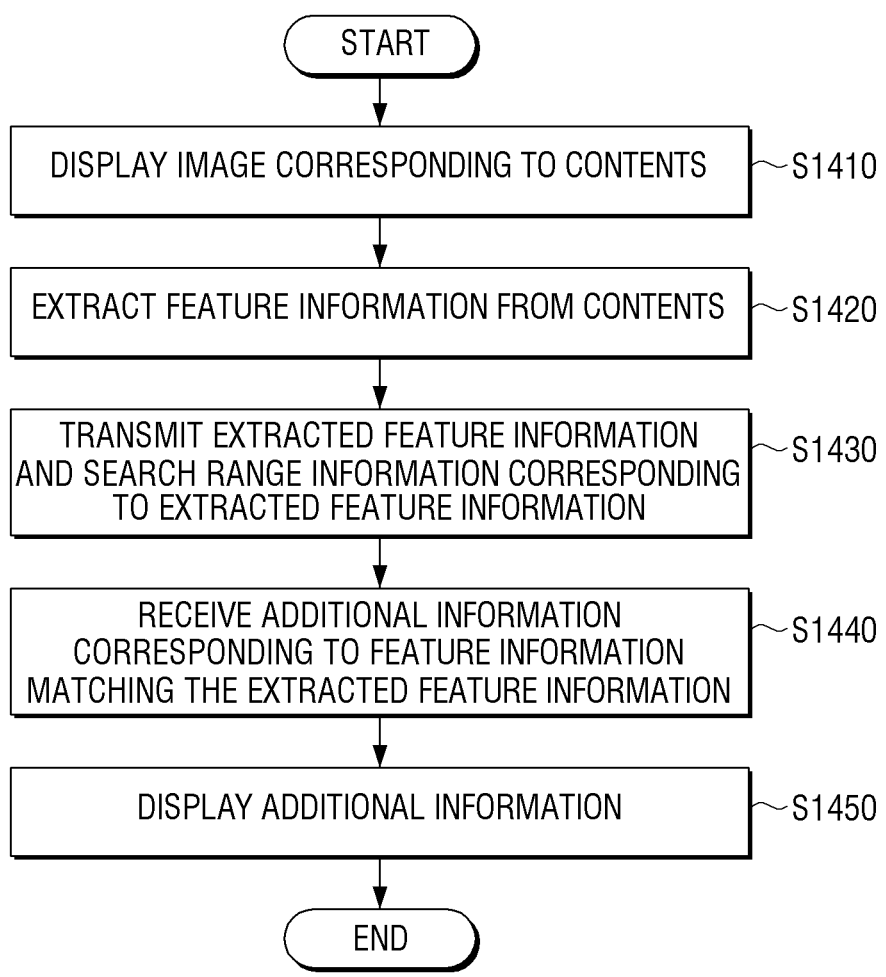
FIG. 14 is a flowchart to describe a control method of a display device according to an embodiment of the disclosure.

FIG. 14 is a flowchart to describe a control method of a display device according to an embodiment of the disclosure.

Referring to FIG. 14, the display device 100 displays an image corresponding to the contents in operation S1410.

The display device 100 extracts feature information from the contents in operation S1420. In this case, the display device 100 may extract the feature information using at least one of the fingerprint extraction method, the OCR recognition method, and the logo recognition method.

The display device 100 transmits the extracted feature information and the search range information corresponding to the extracted feature information to an external server in operation S1430.

The search range information may include at least one of viewing history information and device information. The viewing history information may be provided to the display device 100 by the analytics server 300. The analytics server 300 may collect information on a channel number, a channel name, a program name, a broadcasting company logo analysis result extracted through OCR, or contents recognized through fingerprint matching in the matching server 200, and generate viewing history information on the content viewed on the display device 100. Meanwhile, the analytics server 300 may exist in the display device 100.

The device information may include information on the display device 100 itself (for example, the manufacturer of the display device 100, the location where the display device 100 is installed), or information (for example, information on the service provider of the set-top box connected to the display device 100 or the information on the manufacturer of the game machine connected to the display device 100) of the contents providing device (or source) connected to the display device 100. The device information may be obtained by, for example, a method for confirming the HDMI CEC information, or may be obtained through an input of a remote controller for controlling the display device 100. For example, when the input of the remote controller is channel up/down, it may be known that the source of the currently output contents is a live broadcast.

The display device 100 receives the additional information corresponding to the feature information corresponding to "feature information matching the extracted feature information in the search field corresponding to the search range information among the plurality of search fields" from the external server in operation S1440.

The display device 100 displays the received additional information in operation S1450. For example, when the current cooking contest contents are being displayed, if the received additional information is opinion collection information related to the contents, the display device 100 may display a pop-up window, to a viewer, asking who will be a winner among participants of the cooking contest. As another example, when the advertisement content for a mobile phone is being displayed and the received additional information is advertisement information related to the contents, the display device 100 may display information about where the mobile phone may be purchased.

According to the above-described various embodiments, it is possible to reduce the search field at the time of contents recognition by using additional information such as device information and viewing history, thereby reducing the matching performance and cost. In addition, as the search field is reduced, the server cost and the search time may be reduced.

Since the server query cycle for contents recognition may be reduced by using the additional information as described above, it is possible to reduce the traffic amount, increase the transaction per second (TPS), and reduce the server cost.

The various embodiments described above may be implemented in a recordable medium which is readable by computer or a device similar to computer using software, hardware, or the combination of software and hardware. By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described herein may be implemented by the processor itself. According to a software implementation, embodiments such as the procedures and functions described herein may be implemented with separate software modules. Each of the above-described software modules may perform one or more of the functions and operations described herein.

Meanwhile, the control method of the display device according to the various embodiments of the disclosure described above may be stored in a non-transitory computer-readable medium. The non-transitory computer-readable medium may be stored and used in various devices.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing example embodiments and advantages are merely examples and are not to be understood as limiting. The example embodiments can be readily applied to other types of device or apparatus. Also, the description of the example embodiments is intended to be illustrative, and not to limit the scope of the disclosure, and many alternatives, modifications, and variations will be apparent to those skilled in the art.

What is claimed is:

1. A display device comprising:
    a display;
    a communication interface; and
    a processor configured to:
       control the display to display an image corresponding to content;
       extract feature information from the content;
       control the communication interface to transmit, to an external server, the extracted feature information and search range information comprising information related to a database corresponding to the extracted feature information,
       receive, from the external server, additional information corresponding to the feature information matching the extracted feature information in the database corresponding to the extracted feature information among a plurality of databases by broadcasting channels stored in the external server, through the communication interface, and control the display to display the received additional information while the image corresponding to the content is displayed, and wherein the search range information is used by the external server to identify the database from which feature information matching the extracted feature information is searched from among the plurality of databases, wherein the extracted feature data is extracted with an extraction cycle based on information of a source providing content or a history of receiving the additional information.

2. The display device of claim 1, wherein the search range information comprises main viewing channel information in the display device, the main viewing channel information being used by the external server to further identify a search condition to search for feature information matching the extracted feature information.

3. The display device of claim 1, wherein the search range information comprises at least one of viewing history information or source selection history information.

4. The display device of claim 3, wherein the search range information further comprises information on a source providing the content.

5. The display device of claim 4, wherein the processor is further configured to extract feature information from the content at an extraction cycle corresponding to the information on the source providing the content.

6. The display device of claim 1, wherein the additional information comprises at least one of identification information of the content, advertisement information related to the content, content recommendation information related to the content, or Internet address information related to the content.

7. The display device of claim 1, wherein the extracted feature information represents at least one of a text, a logo, a video fingerprint extracted from the image or an audio fingerprint extracted from audio of the content.

8. The display device of claim 1, wherein the processor is further configured to extract channel information from the content, and based on the extracted channel information, determine whether to transmit the extracted feature information and search range information corresponding to the extracted feature information.

9. An information providing system comprising:
a display device configured to display an image corresponding to content and extract feature information corresponding to the content; and
a server configured to:
receive, from the display device, the extracted feature information and search range information comprising information related to a database corresponding to the extracted feature information,
search for feature information matching the extracted feature information in the database corresponding to the extracted feature information from among a plurality of databases by broadcasting channels, and
provide additional information corresponding to the searched feature information, to the display device, wherein the display device is configured to display the additional information, wherein the search range information is used by the external server to identify the database from which feature information matching the extracted feature information is searched from among the plurality of databases, and wherein the extracted feature data is extracted with an extraction cycle based on information of a source providing content or a history of receiving the additional information.

10. The information providing system of claim 9, wherein the search range information comprises main viewing channel information in the display device.

11. The information providing system of claim 9, wherein the server is configured to sequentially search for the plurality of databases from the database corresponding to the search range information from among the plurality of databases until feature information matching the extracted feature information is identified.

12. The information providing system of claim 9, wherein the search range information comprises history information generated in response to use of the display device and information of the source providing the content, wherein the server is configured to search for feature information matching the extracted feature information within a database corresponding to the history information and information of a source providing the content from among the plurality of databases.

13. A control method of a display device, the method comprising:
displaying an image corresponding to content;
extracting feature information from the content;
transmitting, to an external server, the extracted feature information and search range information comprising information related to a database corresponding to the extracted feature information; and
receiving, from the external server, additional information corresponding to the feature information matching the extracted feature information in the database corresponding to the extracted feature information among a plurality of databases by broadcasting channels stored in the external server; and
displaying the received additional information while the image corresponding to the content is displayed, wherein the search range information is used by the external server to identify theft database from which feature information matching the extracted feature information is searched from among the plurality of databases, wherein the extracted feature data is extracted with an extraction cycle based on information of a source providing content or a history of receiving the additional information.

14. The control method of claim 13, wherein the search range information comprises main viewing channel information in the display device, the main viewing channel information being usable by the external server to further identify a search condition to search for feature information matching the extracted feature information.

15. The control method of claim 13, wherein the search range information comprises at least one of viewing history information or source selection history information.

* * * * *